April 23, 1963    C. B. ROGERS    3,086,669
TRUCK CARRIER WITH TILTING TURNTABLE
Filed Dec. 22, 1959    3 Sheets-Sheet 1

*INVENTOR.*
CYRIL B. ROGERS
BY

April 23, 1963 C. B. ROGERS 3,086,669
TRUCK CARRIER WITH TILTING TURNTABLE
Filed Dec. 22, 1959 3 Sheets-Sheet 2

INVENTOR.
CYRIL B. ROGERS
BY
Brown, Jackson, Boettcher & Dienner

April 23, 1963 C. B. ROGERS 3,086,669
TRUCK CARRIER WITH TILTING TURNTABLE
Filed Dec. 22, 1959 3 Sheets-Sheet 3
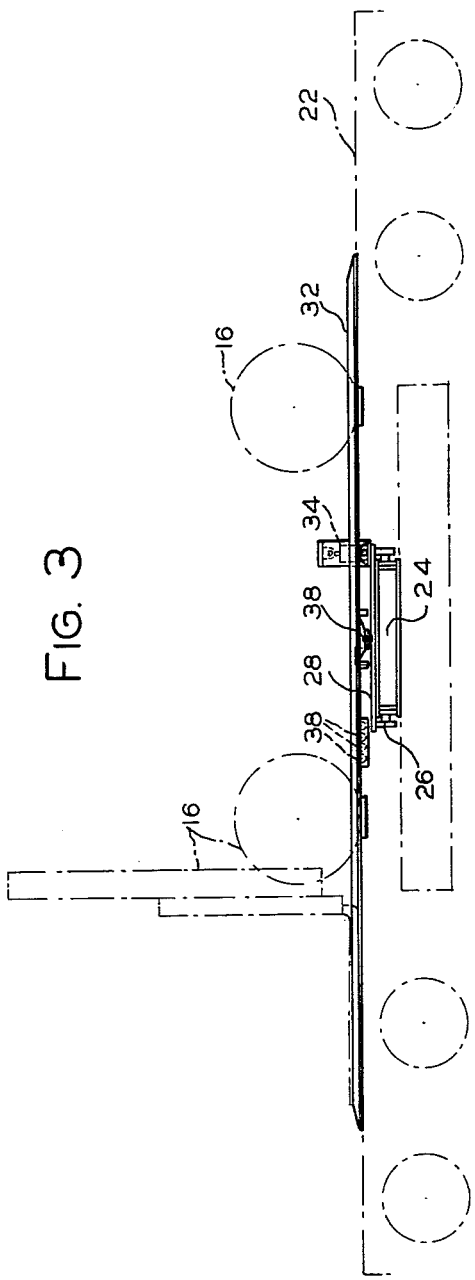
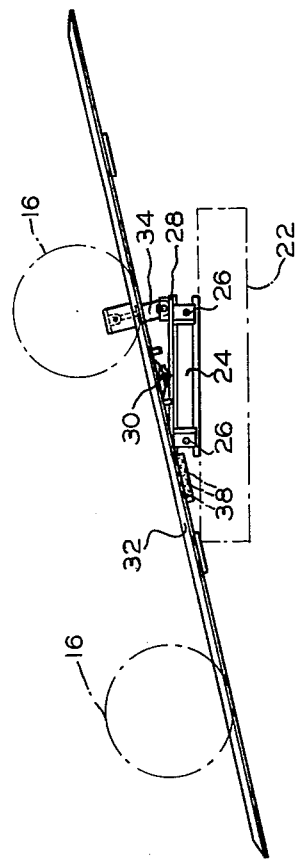
INVENTOR.
CYRIL B. ROGERS

United States Patent Office 3,086,669
Patented Apr. 23, 1963

3,086,669
TRUCK CARRIER WITH TILTING TURNTABLE
Cyril B. Rogers, Battle Creek, Mich., assignor to Clark Equipment Company, a corporation of Michigan
Filed Dec. 22, 1959, Ser. No. 861,312
4 Claims. (Cl. 214—505)

The present invention relates to a carrier for transporting a truck, and particularly, to an improved carrier including ramp and turntable means facilitating self-loading of a truck onto the carrier and self-unloading of the truck from the carrier at either side of the carrier.

In the co-pending application of John R. Wood, Serial No. 861,380, filed December 22, 1959 (assigned to the assignee of this application), there is disclosed an improved method of handling freight which relates to the portable freight carrier system described in the co-pending application of Jack E. Loomis, Serial No. 577,118, filed April 9, 1956, now Patent No. 3,014,609 (also assigned to the assignee of this application). The latter application discloses a novel freight handling system for conveniently transporting freight without undue handling or loading and unloading from one transporting means to another. The system involves the use of portable freight carriers or containers of suitable dimension which may be automatically anchored to and disconnected from a carrier supporting surface of transporting means such, for example, as a railroad flatcar, flat-bed truck trailer, a ship or aircraft, etc., by means of known materials handling equipment, such as fork-lift trucks, straddle carriers and cranes, which materials handling equipment is also available for transferring such freight carrier means from one such transporting means to another. Numerous embodiments of freight carrier means, transporting means, materials handling equipment, and latching and anchor mechanism associated with the freight carrier and transporting means are fully disclosed in said co-pending application.

It has been found in practice of this freight handling system that instances frequently arise, such as at relatively small stations and freight terminals, where the purchase and maintenance at the terminal of such materials handling equipment as fork-lift trucks, straddle carriers, cranes and the like is uneconomic due to the relatively small number of portable freight carriers which are handled in a given period of time.

The method disclosed in the application of John R. Wood overcomes this disadvantage of the system proposed by Jack E. Loomis by providing for transport of a materials handling vehicle, such as a fork-lift truck, a straddle carrier, or a portable self-powered crane, directly with the train carrying the freight carriers or containers, the method being characterized by the steps of self-loading the vehicle onto and self-unloading the vehicle from a vehicle transporting car equipped with a loading ramp and comprising part of the freight train, whereby the vehicle is available for service in conjunction with the train at each station on the train's route.

The object of the present invention is the provision of an improved car for carrying the materials handling vehicle and for facilitating the loading and unloading of the vehicle in accordance with the method of John R. Wood.

It is in particular one object of the present invention to provide an improved vehicle carrier comprising a car, a turntable mounted on the car for rotation in a horizontal plane, and a vehicle loading ramp pivotally mounted on the turntable for vertical tilting movement relative to the car, the turntable being rotatable to align the ramp with the car and to swing the ramp 90 degrees in either direction from its aligned position to alternate positions wherein the ramp extends transversely of the car, the ramp being tiltable toward the ground when disposed transversely of the car to facilitate loading and unloading of the vehicle onto and off of the car at either side thereof.

Another object of the invention is to provide an improved carrier as above described wherein the ramp is tiltable as a consequence of the relative position thereon of the vehicle, whereby the vehicle may be driven onto and off of the ramp when the ramp extends transversely of the car to effect tilting movement of the ramp both down and up.

A further object of the invention is the provision of an improved carrier as defined including a dashpot mechanism associated with said ramp for controlling the speed of tilting movement of the ramp and for assisting in retaining the ramp in the position to which it was last tilted.

A still further object of the invention is the provision of an improved carrier of the character described including drive means for the turntable, motion-transmitting means on the ramp engageable by at least one traction wheel of the vehicle when the vehicle is properly located on the ramp, and power transmission means extending between the drive means and motion-transmitting means for causing the vehicle to drive the turntable, the vehicle being operable in forward gear to swing the turntable and ramp in one direction and in reverse gear to swing the turntable and ramp in the opposite direction, whereby the vehicle is fully self-loading and self-unloading.

Other objects and advantages of the invention will become apparent in the following detailed description.

Now, in order to acquaint those skilled in the art with the manner of making and using my improved truck carrier, I shall describe, in connection with the accompanying drawings, a preferred embodiment of the carrier and the preferred manner of making and using the same.

In the drawings:

FIGURE 1 is a perspective view illustrating practice of the above described method and showing a motor truck having a flat-bed trailer for receiving freight carriers, a fork-lift truck for handling the freight carriers, and a freight train having flatcars for receiving freight carriers and a truck carrier car for accommodating self-loading and self-unloading of the fork-lift truck onto and off of the train;

FIGURE 3 is a side elevation of the truck carrier car; the truck loading components thereof being illustrated in solid lines and certain elements of the car and a fork-lift truck received thereon being depicted in dot-dash lines; and FIGURE 4 is an end view of the car showing the vehicle loading ramp extending transversely of the car and tilted to accommodate unloading and loading of the truck.

Figure 1:
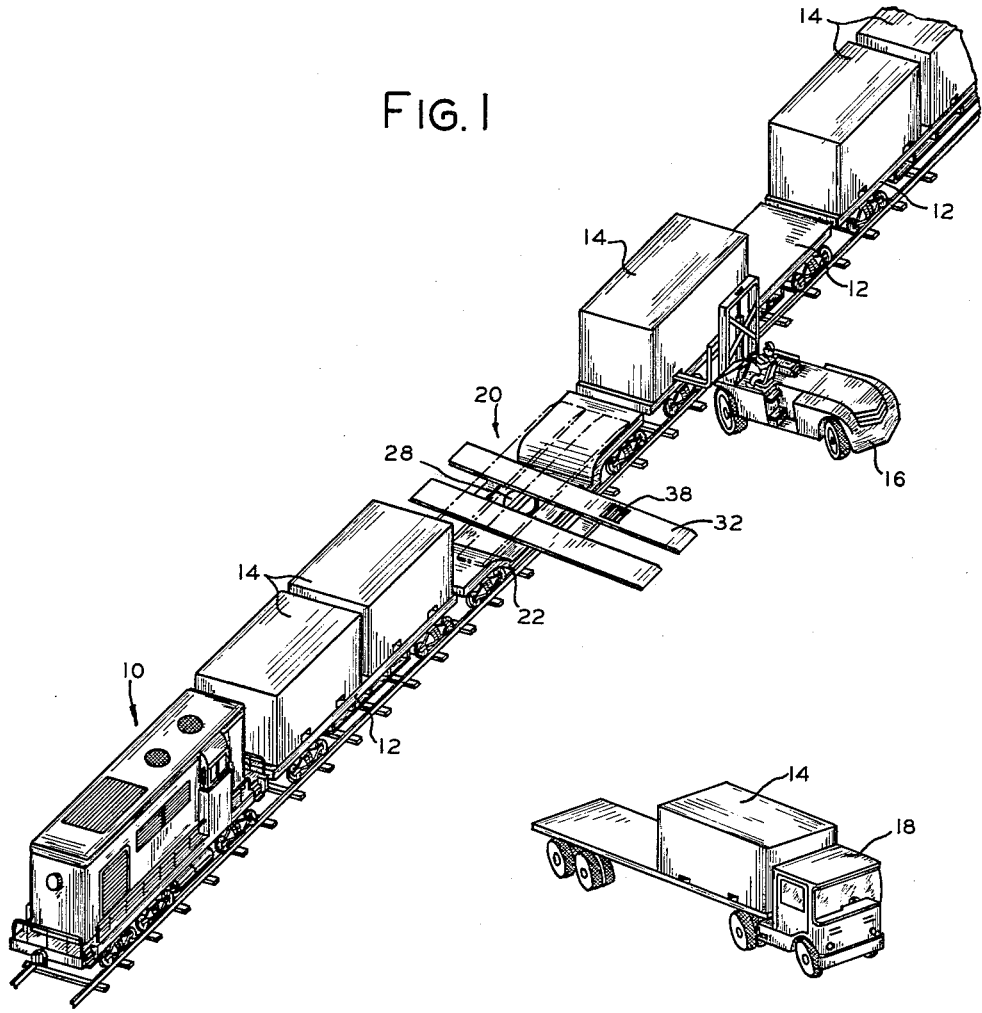

As is disclosed in the said co-pending application of Jack E. Loomis, the freight handling system to which this invention relates involves the use of a freight train 10 (here shown as a railroad train) having a plurality of flatcars 12 each adapted to receive one or more (usually two) portable freight carriers or containers 14 each comprising a portable box or the like adapted for reception therein of freight consigned to a given consignee. The portable carriers 14 are each adapted to be loaded onto and removed from the flatcars 12 by materials handling vehicles, such as the illustrated fork-lift truck 16, a straddle carrier, or a crane. The materials handling vehicle is employed to transfer the carriers or containers between the train and the flat-bed of a motor truck 18, a storage rack, a loading dock, or the like. Each carrier or container is preferably equipped with latching mechanism operated by the materials handling vehicle or truck 16 for latching or anchoring the carrier to the car of the train or the bed of the truck when it is deposited thereon, and for automatically unlatching the carrier when the fork-lift truck or other materials handling vehicle is positioned to move the carrier.

The materials handling vehicle employed in the described system must of necessity be relatively large, and consequently expensive. At small and intermediate size stations and freight terminals, it is not economically prectical to make the sizable investment thus required to handle the portable freight carriers due to the relatively small number of carriers handled.

The method of John R. Wood overcomes this shortcoming of the described system by incorporating in the train a suitable materials handling vehicle, and a special car for carrying the materials handling vehicle and for accommodating unloading and loading of the vehicle at each station on the train's route.

Figure 2:
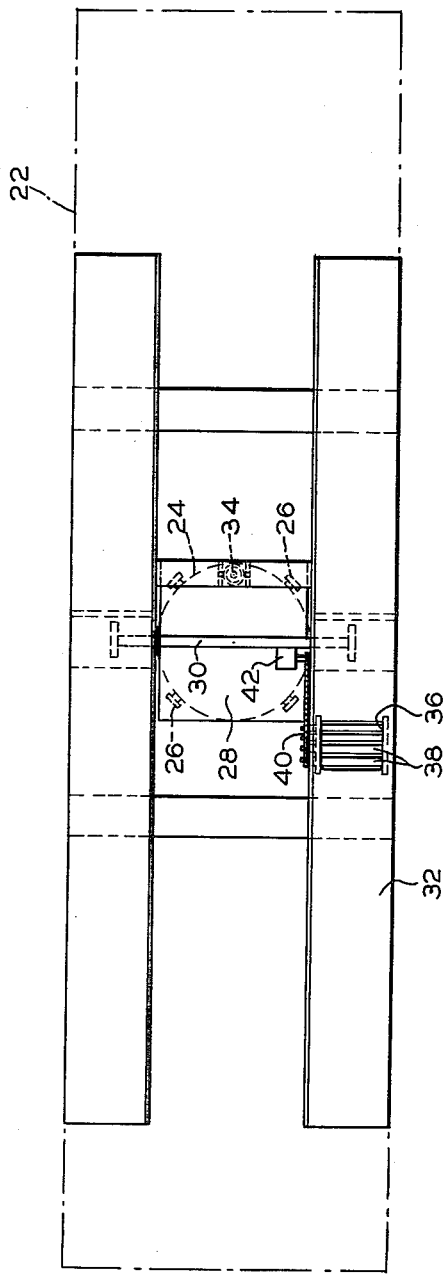
FIGURE 2 is a plan view of the truck carrier car showing the truck receiving ramp thereof aligned with the car; the outline of the car being depicted in dot-dash lines and the truck loading components thereof in solid lines.

Such a special car as constructed according to the present invention is indicated at 20 in FIGURE 1, and is disclosed in detail in FIGURES 2 to 4. As illustrated, a standard drop-center car 22 is equipped in the dropped or lowered central portion thereof with a supporting pedestal 24 having wheels 26 thereon for rotatably mounting a horizontally disposed turntable 28. Pivotally mounted on the turntable by means of a horizontal cross shaft 30 is a vertically tiltable vehicle or truck receiving ramp 32 of generally conventional construction. As will be noted particularly from FIGURE 4, the pivot axis of the ramp is located substantially centrally of the turntable but nearer to one end of the ramp than the other, so that when the turntable is rotated to dispose the ramp transversely of the car, at least the longer end portion of the ramp will project over the side of the car to accommodate tilting of the same downwardly to the ground.

In accordance with the principles of the invention of John R. Wood, the ramp is adapted to accommodate self-loading and unloading of the vehicle and is thus constructed to be tilted as a consequence of the relative position thereon of a vehicle. In particular, as shown in FIGURE 4, the position of the vehicle on the ramp will determine the ramp's position; the ramp being tilted downwardly when the vehicle is over-center relative to the axle or shaft 30 in the direction of the longer end portion of the ramp (as depicted in dot-dash lines) and being disposed horizontally when the vehicle is somewhat over-center relative to the shaft 30 in the direction of the shorter end portion of the ramp. Since the ramp is tilted solely as a consequence of the position of the vehicle thereon, it is desirable to control the rate of movement of the ramp. For this purpose a motion-retarder such as a dashpot 34, preferably hydraulic, is provided, the dashpot including a cylinder secured to the turntable and a piston connected to a vertically movable part of the ramp. To facilitate location of the vehicle on the ramp in the position thereof that will cause the ramp to be disposed horizontal, at least one runway of the ramp is provided with a vehicle wheel locating opening or depression 36.

Disposed within this opening 36 is a motion-transmitting means, such as a plurality of rollers 38, adapted to be engaged and driven by a traction wheel of the vehicle. The motion-transmitting means or rollers are in turn connected by a power transmission means 40, such as a gear train or a chain and sprocket arrangement, to a drive assembly 42 provided between the turntable and its supporting structure for rotating the turntable and ramp relative to the car. Consequently, when the vehicle is appropriately positioned on the car with one of its traction wheels on said rollers, the vehicle through its own power source and its traction wheel is adapted to rotate the turntable.

Normally, the ramp 32 extends longitudinally of the car, and may be locked in such position by locking pins fitting into suitable locking apertures (not shown) provided in the ramp or turntable and the pedestal or car. Also, the materials handling vehicle may be lashed to the car or ramp during transport thereof by the train.

When the train arrives at a station at which one or more freight carriers are to be delivered and/or picked up, an attendant at the station acts as operator of the lift-truck or other materials handling vehicle carried on the train. The vehicle lashings and the turntable locking pins are removed, and the vehicle's engine started. By operating the vehicle in forward gear or reverse gear, the station attendant will cause the vehicle to turn the turntable and ramp in the appropriate direction for unloading of the vehicle at the desired side of the train. Preferably, stops are provided to locate the ramp at right angles to the car when the turntable has been rotated the proper amount. The station attendant then commences slowly to drive the vehicle off the longer end portion of the ramp, whereupon that end portion tilts downwardly to the ground under the control of the dashpot 34 to permit the vehicle to be driven off the ramp and onto the ground. The vehicle is then operated in a conventional manner to remove freight carriers from the train and to place them onto motor trucks, other transport vehicles, storage racks, or the like, and/or to load freight carriers from the latter units onto the cars 12 of the train. The vehicle is then driven back up the ramp, and as it approaches its intended storage position, the ramp tilts back at a controlled rate to its horizontal position. With the vehicle properly located on the ramp with one of its traction wheels engaging the rollers 38, and the ramp disposed horizontally, the attendant may operate the vehicle, in reverse gear or forward gear as is appropriate, to drive the rollers 38 and drive assembly 42 to swing the ramp back into alignment with the car. The turntable is then locked in position and the vehicle lashed to the car, whereupon the train may advance to the next station.

At each station, the time required for loading and/or unloading of freight carriers or containers is at a minimum. Consequently, the described apparatus of my invention facilitates prompt and effective accomplishment of the freight handling method comprising the steps of loading onto flatcars at the point of shipment by means of a materials handling vehicle a plurality of freight carriers or containers each containing freight bound for a particular station, driving the vehicle onto another flatcar equipped with a loading ramp for transport of the vehicle by the train with the freight carriers, driving the vehicle off its car at each station, unloading from the cars by means of the vehicle the freight carrier or carriers containing freight bound for the respective station and loading onto the cars freight carriers to be picked up at the respective station, and driving the vehicle back onto its car at each station for transport by the train to the next station.

While I have shown and described what I regard to be the preferred embodiment of my improved truck carrier, it will be appreciated that various changes, rearrangements and modifications may be made therein without departing from the scope of the invention, as defined by the appended claims.

I claim:
1. A vehicle carrier comprising a car, a turntable mounted on said car for rotation in a horizontal plane, a vehicle loading ramp pivotally mounted on said turntable for vertical tilting movement about an axis intersecting the turntable axis, said ramp being tiltable to and from horizontal position as a consequence of the relative position thereof of a vehicle and having its center of gravity offset from its pivotal axis to remain in position tilted from said horizontal position upon passage of the vehicle therefrom, motion-retarding means between said ramp and said turntable for controlling the rate of tilting movement of said ramp, and drive means between said turntable and said car and including means adjacent said ramp engageable by a traction wheel of a vehicle, said last-named means being located on said ramp to be engaged by the vehicle traction wheel when the vehicle is positioned to tilt said ramp to horizontal position parallel to said turntable, said last-named means transmitting power from the vehicle to said drive means for causing said turntable to be rotated by the vehicle.

2. A vehicle carrier comprising a car, a turntable mounted on said car for rotation in a horizontal plane, a vehicle loading ramp pivotally mounted on said turntable for vertical tilting movement about an axis intersecting the turntable axis, said ramp being tiltable to and from horizontal position as a consequence of the relative position thereon of a vehicle and having its center of gravity offset from its pivotal axis to remain in position tilted from said horizontal position upon passage of the vehicle therefrom, motion-retarding means between said ramp and said turntable for controlling the rate of tilting movement of said ramp, drive means between said turntable and said car for rotating said turnable, motion-transmitting means on said ramp engageable by a traction wheel of a vehicle received thereon, and power transmission means between said motion-transmitting means and said drive means for transmitting power from the vehicle wheel to said drive means, said motion-transmitting means being located on said ramp to be engaged by the vehicle traction wheel when the vehicle is positioned to tilt said ramp to horizontal position parallel to said turntable.

3. A vehicle carrier comprising a car, a turntable mounted on said car for rotation in a horizontal plane, a vehicle loading ramp pivotally mounted on said turnable for vertical tilting movement, the pivotal axis of said ramp being located closer to one end thereof than the other to effect projection of said other end laterally outward of the car, said turntable being rotatable in either direction from a position wherein said ramp is aligned with said car to dispose said other end of said ramp at either side of the car with said ramp extending transversely of the car, said ramp in either of its latter positions being tiltable to and from horizontal position as a consequence of the relative position thereon of a vehicle and being in consequence of said pivotal axis location retained in position tilted from said horizontal position upon passage of the vehicle therefrom, a drive assembly between said turntable and said car for rotating said turntable, roller means on said ramp engageable by a traction wheel of the vehicle when the vehicle is positioned on said ramp to tilt the ramp to horizontal position, and a power transmission between said roller means and said drive assembly for transmitting power from the vehicle traction wheel to said drive assembly, whereby said ramp and turntable are operable by the vehicle to render the vehicle self-loading and self-unloading.

4. A vehicle carrier comprising a car, a turntable mounted on said car for rotation in a horizontal plane, a vehicle loading ramp pivotally mounted on said turntable centrally thereof for vertical tilting movement, the pivotal axis of said ramp being located closer to one end thereof than the other to effect projection of said other end laterally outward of the car, said turntable being rotatable in either direction from a position wherein said ramp is aligned with said car to dispose said other end of said ramp at either side of the car with said ramp extending transversely of the car, said ramp in either of its latter positions being tiltable to and from horizontal position as a consequence of the relative position thereon of a vehicle and being in consequence of said pivotal axis location retained in position tilted from said horizontal position with said other end lowered upon passage of the vehicle off the ramp, a dashpot between said ramp and said turntable for controlling the rate of tilting movement of said ramp, a drive assembly between said turntable and said car for rotating said turntable, rollers on said ramp engageable by a traction wheel of the vehicle when the vehicle is positioned on said ramp to tilt the ramp to horizontal position, and a power transmission between said rollers and said drive assembly for transmitting power from the vehicle traction wheel to said drive assembly, whereby said ramp and turntable are operable by the vehicle to render the vehicle self-loading and self-unloading.

References Cited in the file of this patent

UNITED STATES PATENTS

| | | |
|---|---|---|
| 1,225,030 | Haynes | May 8, 1917 |
| 1,477,332 | Elzey | Dec. 11, 1923 |
| 1,585,596 | Menges | May 18, 1926 |
| 1,966,866 | Miller | July 17, 1934 |
| 1,987,376 | Stearns | Jan. 8, 1935 |
| 2,285,207 | Johnson | June 2, 1942 |
| 2,373,148 | Smith | Apr. 10, 1945 |
| 2,627,985 | Sathre et al. | Feb. 10, 1953 |
| 2,782,733 | Ewing | Feb. 26, 1957 |
| 2,933,052 | Mellam | Apr. 19, 1960 |

FOREIGN PATENTS

| | | |
|---|---|---|
| 705,916 | Great Britain | Mar. 24, 1954 |